(12) United States Patent
Freimann

(10) Patent No.: US 7,403,290 B1
(45) Date of Patent: Jul. 22, 2008

(54) METHOD AND MEANS FOR DETERMINING THE SHAPE OF A ROUGH SURFACE OF AN OBJECT

(75) Inventor: Rolf Freimann, Aalen (DE)

(73) Assignee: Carl Zeiss SMT AG, Oberkochen (DE)

(*) Notice: Subject to any disclaimer, the term of this patent is extended or adjusted under 35 U.S.C. 154(b) by 0 days.

(21) Appl. No.: 11/541,180

(22) Filed: Sep. 29, 2006

Related U.S. Application Data

(63) Continuation of application No. 11/478,828, filed on Jun. 30, 2006, now abandoned.

(51) Int. Cl.
*G01B 11/02* (2006.01)

(52) U.S. Cl. ...................................... 356/512

(58) Field of Classification Search ................ 356/511, 356/512, 513, 514, 516
See application file for complete search history.

(56) References Cited

U.S. PATENT DOCUMENTS

| | | | | |
|---|---|---|---|---|
| 4,714,348 A | * | 12/1987 | MaKosch | 356/495 |
| 4,741,620 A | * | 5/1988 | Wickramasinghe | 356/489 |
| 5,369,489 A | * | 11/1994 | Somekh | 356/489 |
| 5,471,303 A | | 11/1995 | Ai et al. | |
| 5,914,782 A | * | 6/1999 | Sugiyama | 356/491 |
| 6,028,670 A | | 2/2000 | Deck | |
| 6,392,752 B1 | * | 5/2002 | Johnson | 356/511 |

FOREIGN PATENT DOCUMENTS

| | | |
|---|---|---|
| WO | WO 94/18521 | 8/1994 |
| WO | WO 2005/124274 A2 | 12/2005 |

OTHER PUBLICATIONS

Theoretical Measurements Uncertainty of White-Light Interferometry on Rough Surfaces, Pavlicek et al., Applied Optics, Apr. 1, 2003/ vol. 42, No., pp. 1809-1813.

Low-coherence Interferometer System for the Simultaneous Measurement of Refractive Index & Thickness, H. Maruyama et al., Mar. 1, 2002/ vol. 41, No. 7/Applied Optics, pp. 1351-1322.

Interferometric Laser Profilometer for Rough Surfaces, P. de Groot, Mar. 15, 1991/ vol. 16, No. 6/ Optics Letter, pp. 357-359.

(Continued)

*Primary Examiner*—Michael A. Lyons
(74) *Attorney, Agent, or Firm*—Milde & Hoffberg, LLP

(57) ABSTRACT

A method for determining the shape of a rough surface of an object comprises the steps of providing an object having a given roughness related height variation; providing an interferometer for wave front measurement comprising a measurement beam of electromagnetic radiation having a wavelength $\lambda$ not exceeding 10 times of the roughness related height variation of the object surface, which measurement beam comprises an incoming wave for illuminating the object surface and an outgoing wave comprising radiation from the incoming wave reflected off the object surface; directing the incoming wave of the measurement beam onto the object surface at least two different probing locations, thereby illuminating an areal element of the object surface at each of the probing locations; and measuring the respective phase distribution of the outgoing wave by means of the interferometer of each of the at least two different probing locations.

38 Claims, 8 Drawing Sheets

OTHER PUBLICATIONS

Xi-100 Non-Contact Optical Profiler, Ambios Technologies, Inc., 2004.

The New Zeiss Interferometer, M. Küchel, SPEI vol. 1332, Optical Testing and Metrology III; Recent Advances in Idustrial Optical Inspection (1990), pp. 655-663.

Direct Phase Detecting System, Y. Ichioka et al., Jul. 1972/vol. 11, No. 7/Applied Optics, pp. 1507-1511.

Real-Time Fringe-Pattern Analysis, Lawrence Mertz, May 15, 1983/ vol. 22, No. 10/ Applied Optics, pp. 1535-1539.

* cited by examiner

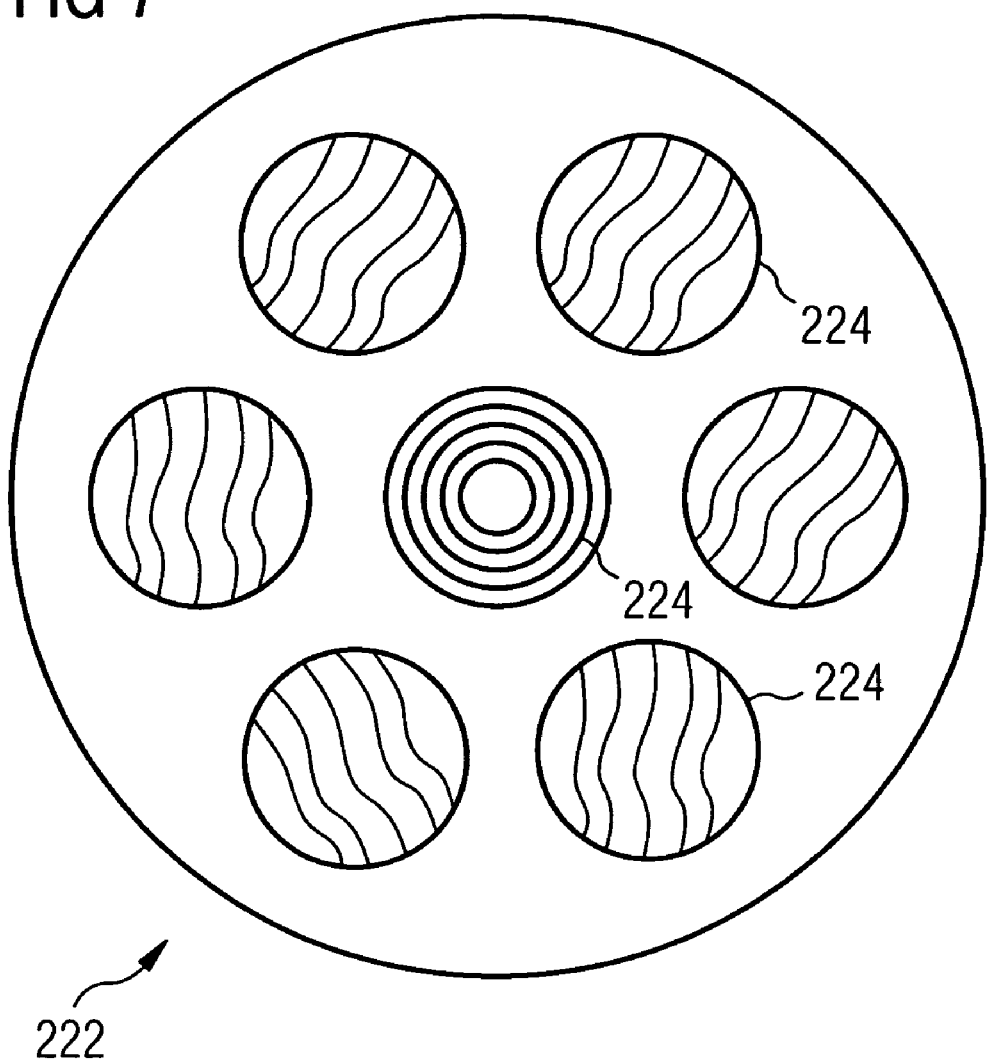

METHOD AND MEANS FOR DETERMINING THE SHAPE OF A ROUGH SURFACE OF AN OBJECT

CROSS-REFERENCE TO RELATED APPLICATION

This application is a continuation of U.S. application Ser. No. 11/478,828, filed Jun. 30, 2006 now abandoned, entitled "METHOD AND MEANS FOR DETERMINING THE SHAPE OF A ROUGH SURFACE OF AN OBJECT".

BACKGROUND OF THE INVENTION

1. Field of the Invention

The invention relates to a method and to means for determining the shape of a rough surface of an object. The invention further relates to a coordinate measurement machine comprising such means. Additionally the invention relates to an optical element and a mandrel for manufacturing an optical element. Further, the invention relates to a method for calibrating means for determining the shape of a rough surface of an object.

A rough or a matt surface in this context is in contrast to a smooth surface a surface, which appears matt when being illuminated from at least one angle of incidence with light having a given wavelength $\lambda$. The roughness related height variation of such a surface is typically around $\lambda/4$ or more. Light reflected off the surface then has a phase shift variation of $\lambda/2$, causing destructive interference in the reflected light. Rough or matt surfaces referred to in this application can be ground, abraded or lapped pre-stages of polished surfaces, as used in optical systems. Also optical devices in their final from, like scattering discs, diffusors or visual displays can have rough surfaces. Materials used for such objects can be glasses, including fused silica, crystals like calcium fluoride or glass ceramics like Zerodur, ULE or Sital.

2. Description of the Related Art

It is known in the art to measure the shape of smooth metallic surfaces using laser interferometric methods. However, this method cannot be used for determining the shape of a rough surface due to a large amount of speckle appearing when illuminating a rough surface with highly coherent light. In another previously known method, the shape of a rough surface is determined by so called white-light interferometry. According to this method, light having a short coherence length is used for interferometric measurement of the shape of a rough surface (see for example WO 1994018521 A1). However, the measurement accuracy of white-light interferometry is considered insufficient. The measurement uncertainty of this method has been found to be on the order of the roughness related height variation of the test object (Theoretical measurement uncertainty of white-light interferometry on rough surfaces, Pavel Pavlicek and Jan Soubusta, 1 Apr. 2003, Vol. 42, No. 10, Applied Optics, pages 1809-1813).

SUMMARY OF THE INVENTION

It is an object of the present invention to provide a method and means of the above mentioned type, which facilitate the determination of the shape of a rough surface of an object with improved accuracy.

In order to achieve the above object, according to the present invention a method for determining the shape of a rough surface is provided, which comprises the following steps: providing an object having a given roughness related height variation, providing an interferometer for wave front measurement comprising a measurement beam of electromagnetic radiation having a wavelength $\lambda$ not exceeding ten times of the given roughness related height variation of the object surface, which measurement beam comprises an incoming wave for illuminating the object surface and an outgoing wave comprising radiation from the incoming wave reflected off the object surface, directing the incoming wave of the measurement beam onto the object surface at least two different probing locations, thereby illuminating an areal element of the object surface at each of the probing locations, wherein the areal element is dimensioned such, that the maximum height variation of the object surface within the respective illuminated areal element is smaller than half of the given roughness related height variation and measuring the respective phase distribution of the outgoing wave by means of the interferometer at each probing location. Advantageously, the shape of the rough object surface is determined from the measured phase distributions.

Further, the above object is achieved by means for determining the shape of a rough surface of an object having a given roughness related height variation, the means being adapted for interferometric wave front measurement and including a measurement beam of electromagnetical radiation having a wavelength $\lambda$ not exceeding 10 times of the given roughness related height variation of the object surface, which measurement beam comprises an incoming wave for illuminating the object surface and an outgoing wave comprising radiation from the incoming wave reflected off the object surface, wherein the means further comprise a directing device, which is adapted for directing the measurement beam onto the object surface at least two different probing locations and thereby illuminating an areal element of the object surface at each of the probing locations, wherein the areal element is dimensioned such, that the maximum height variation of the object surface within the respective illuminated areal element is smaller than the given roughness related height variation, and wherein the means are adapted for measuring the respective phase distribution of the outgoing wave at each probing location. Advantageously, the means comprise an analysing device for determining the shape of the rough object surface, such as the shape of a rough metallic object, from the measured phase distributions. Further the object is achieved according to the invention by a coordinate measurement machine comprising such means.

As mentioned above the shape of the object surface can be derived from the respective measured phase distributions. The measured phase distributions characterize the wave front of the outgoing wave of the measurement beam at the different probing locations. The shape of the rough surface determined according to the invention is in particular defined as the profile of the rough surface, i.e. including the roughness related height variation, after averaging the profile as follows. For averaging the profile, advantageously an averaging interval larger than the autocorrelation length of the profile is used. The method and the means according to the invention are particularly suited for determining the shape of ground, abraded or lapped pre-stages of optical surfaces.

In the case of lapped surfaces, the abrasive typically has a grain size of 10 to 100 microns. In this case, the resulting autocorrelation length of the rough profile is also in this order of magnitude. Also the roughness related height variation of the rough surface can be determined at least in approximation from the grain size of the abrasive. The typical structure of such a lapped surface is in many cases known to an extent, which allows the illuminated areal element of the object surface to be sized such, that the maximum height variation of the object surface within the illuminated areal element is smaller than the given roughness related height variation. In general, from the type of the prior mechanical processing of the object surface typical local slope angles within the surface profile or other information on the typical microstructure of the surface is known. In particular often dimensions, within which the full given roughness related height variation is not present, are known. From this information a maximum size of the illuminated areal element can be adjusted. In case such properties of the rough object surface are not known from the type of the prior processing of the surface suitable measurements can be made.

Further, optical objects having a rough surface in their final form, such as diffraction disks, diffusors, imaging screens or similar items can be tested by the method and the means according to the invention. The material of the object can include glasses including fused silica, crystals like calcium fluoride, or glass ceramics like Zerodur, ULE or Sital. Further, the inventive method and means can be used for determining the shape of rough metallic surfaces. A rough metallic surface can be produced by milling a metallic object. Also grey cast iron has a rough surface. The method and the means, in particular the coordinate measurement machine are particularly suited for use in the in the automotive industry, for example for measuring the shape of inner walls of combustion engine cylinders.

Advantageously, the coordinate measurement machine is adjusted for determining the shape of automobile components, especially engine parts, e.g. the inside shape of an engine zylinder.

Put in different words, according to the invention, the measurement beam is directed onto at least two different probing locations of the object surface. The measurement beam comprises electromagnetic radiation, in particular optical radiation having a wavelength $\lambda$ not exceeding ten times of the roughness related height variation of the object surface. The roughness related height variation of the object surface can be defined in terms of the rms height variation (root mean square of the height variation) of the surface profile. As already mentioned above in the case of a lapped surface, in which the abrasive medium has a given grain size, the roughness related height variation can be estimated from the grain size. By choosing the given wavelength $\lambda$ of the electromagnetic radiation to be smaller than or equal to ten times of the roughness related height variation of the object surface, the object surface is considered to be rough with respect to the wavelength $\lambda$. That means, the roughness related height variation of the object surface is equal to or larger than $\lambda/10$, causing destructive interference effects when being illuminated with light of the given wavelength $\lambda$. Advantageously, the wavelength $\lambda$ of the electromagnetic radiation contained in the measurement beam does not exceed four times of the roughness related height variation of the object surface. In this case, the roughness related height variation is larger than $\lambda/4$, causing the light reflected off this rough surface to contain components having phase differences of $\lambda/2$ with respect to other components of the reflected light. This leads to destructive interference between the these components, which causes the object surface to appear matt to a major extent when illuminating the surface with radiation of the wavelength $\lambda$ used for the measurement beam.

Further, the directing device, which can be an imaging device like an optical imaging lens, is adjusted to illuminate an areal element of a defined shape and size on the object surface. The areal element is small in size compared to the overall object surface. Advantageously, the illumination is generated by a central bright region of a diffraction pattern created by the imaging device. The central bright region is in particular a so called Airy-disk, which is created when illuminating a circular aperture uniformly with coherent radiation. The illuminated area on the object surface is dimensioned such, that the illuminated areal element of the object surface is smaller than the given roughness related height variation of the object surface. Therewith, the effective roughness related height variation "seen" by the measurement beam is reduced. Therefore, less destructive interference and thus less speckle is created in the outgoing wave. In result, the shape of a rough surface can be measured with sub-lambda resolution.

The speckle reducing effect according to the invention allows the use of coherent radiation for the measurement beam, in particular radiation having a longer coherence length than white light. Advantageously radiation having a coherence length of at least 10 microns is used for determining the shape of the rough surface. Due to the long coherence length of the measurement beam radiation, an improved measurement accuracy can be obtained, while at the same time the amount of speckle is reduced to an acceptable degree.

In an advantageous embodiment the incoming wave of the measurement beam is directing onto the object surface by focusing the incoming wave onto the object surface using an imaging device. Thereby, the object surface is in each case in the focus of the imaging device, which can be an optical imaging lens. The position of the imaging device is generally referred to as "cat-eye-position".

According to the invention it is further advantageous, if the maximum height variation of the object surface within the respective illuminated areal element is smaller than half, in particular smaller than a quarter of the wavelength $\lambda$ of the measurement beam. This reduces the amount of destructive interference of speckle in the reflected radiation further and therefore allows for an improved measurement accuracy. If the maximum height variation is smaller than a quarter of the wavelength $\lambda$, radiation components reflected off the lowest levels of the surface and radiation components reflected off the highest levels of the surface have a phase difference of less than $\lambda/2$, and therefore no complete destructive interference is created within the reflected light.

In a further advantageous embodiment according to the invention, the electromagnetic radiation of the measurement beam comprises coherent radiation, especially having a longitudinal coherence length of at least 10 µm. The electromagnetic radiation of the measurement beam should have a narrow spectral band, advantageously be quasi-monochromatic. Such electromagnetic radiation can for example be generated by a laser. The use of coherent radiation allows an improvement in measurement accuracy.

It is further advantageous, if the shape of the object surface is derived from the measured phase distributions at the at least two different probing locations, in particular by calculating an average phase for each of the measured phase distributions. The average phase allows deriving an average height of the illuminated areal element at each probing location. Accordingly, average heights at each of the probing locations are determined, which allows to derive the shape of the object surface without considering its roughness related height variation.

It is further advantageous, if the object surface has a given design shape and the measurement beam is focused onto the object surface by adjusting the focus of the imaging device to the surface of the design shape at the respective probing location. Measuring the respective phase distribution of the outgoing waves associated to each of the probing locations allows determining the deviation of the actual object surface from the design surface. The design surface can for example be the surface of a rotationally symmetric object or any other arbitrarily shaped object. In particular, the design surface can be the surface of a rotationally symmetric asphere or a freeform surface.

It is further advantageous, if the phase distribution of the outgoing wave is measured by recording at least one interferogram, preferably at least three interferograms, generated by the outgoing wave and preferably a reference beam of the interferometer. The radiation of the reference beam is advantageously of the same wavelength as the radiation of the measurement beam. Typically, the reference beam is split off an illumination source, which also supplies the radiation of the measurement beam. The interferometer used for the above mentioned embodiment can be of various types, for example a scanning Michelson-interferometer or a scanning Mireau-interferometer. These interferometers record at least three interferograms, each at a different path length difference between the optical path lengths of the measurement beam and the reference beam within the interferometer. This path length difference can be created by moving a reflector within the path of the reference beam back and forth. From the mentioned at least three interferograms of different path length differences, the wave front or the phase distribution of the outgoing wave of the measurement beam is measured. Alternatively, the wave front or the phase distribution can be measured by so-called Direct Measuring Interferometry (DMI). In this case, the wavefront is extracted from a single interferogram with many tilt fringes. For details regarding Direct Measuring Interferometry reference is made to Y. Ichioka, M. Inuiya, "Direct Phase Detecting System", Appl. Opt. 11 (1972) 1507-1512; L. Mertz, "Real-time fringe-pattern analysis", Appl. Opt. 22 (1983) 1535-1539; M. Kuchel "The new Zeiss interferometer", SPIE Vol. 1332 Optical Testing and Metrology III: Recent Advances in Industrial Optical Inspection (1990) 655-663. The contents of the referenced documents are explicitly included into the disclosure of this application.

It is further advantageous, if the focus of the imaging device is adjusted such, that at most two interference maxima are generated in a single interferogram. These interference maxima typically appear in the form of interference fringes. Ideally, the object surface is positioned exactly in the focus of the imaging device. When the object is moved out of focus, a significant amount of speckle is observed in the interferograms, once more than +/−2 interference rings appear in the interferogram. Such speckle reduces the accuracy of the measurement.

It is further advantageous, if focusing the incoming wave of the measurement beam onto the object surface includes the steps of setting the focus of said imaging device to a starting focus position and at least one deviated focus position, recording an interferogram generated by the outgoing wave and a reference beam of the interferometer for each focus position, determining the amount of speckle in the respective in the respective interferogram for each focus position and adjusting the focus of said imaging device to the focus position attributed to the interferogram having the smallest amount of speckle. Preferably, the maximum spatial frequency of each of the interferograms is determined by Fourier Transform and the focus of the imaging device is adjusted to the focus position attributed to the smallest maximum spatial frequency. This procedure takes advantage of the effect, that the closer the focus position is to the object surface, the less speckle appears in the corresponding interferogram. The less speckle there is in the interferogram, the smaller the maximum spatial frequency determined by Fourier Transform becomes. The optimum focus position of the imaging device for conducting the inventive shape measuring method can be obtained by iteratively performing the above steps. As mentioned above, the amount of speckle is relatively small, if no more than two interference rings are observed in the interferogram. In particular, the above focus adjustment procedure allows bringing the focus at least into a range, in which no more than +/−2 interference rings appear in the interferogram.

In a further advantageous embodiment the phase distribution of the measurement beam is determined from the information contained in a central area of the at least one interferogram. It has been found, that the radiation close to the optical axis of the imaging device contains less speckle than the radiation further away from the optical axis, as in this case the aperture of observation is smaller. This again allows a more accurate shape measurement.

It is further advantageous, if for each probing location phase distribution measurements are made at least two measurement positions on the object surface being spaced apart by less than the distance between neighbouring probing locations, in particular by less than a respective extension, in particular by less than a respective diameter, of the illuminated areal elements, and shape of the object surface is derived by respectively averaging the measurement results obtained at the respective measurement positions at of each of the probing locations. In particular, the distance between the at least two measurement positions for a given probing location is in the range of a few microns. Between the measurement positions the object is advantageously moved laterally with respect to the optical axis of the imaging device. The measurements obtained for the respective measurement positions are subsequently averaged, which reduces the effect of remaining speckle in the interferograms. As a result of this averaging the shape of the rough surface can be determined with better accuracy.

It is further advantageous, if directing the measurement beam onto the object surface at least two different probing locations includes subsequently directing the measurement beam to each of the probing locations, in particular scanning the measurement being along the object surface. That means, the measurement beam and the object surface are moved relative to each other, in particular laterally with respect to the optical axis of the imaging device. Advantageously, the object is moved with the measurement beam remaining fixed in space. The movement can be made by mechanical, electromechanical or other means. Depending on the geometric shape of the object different movement means can be implemented. In case the design surface is flat, a shifting table can be used. In case the design surface has the shape of a sphere telescopable calottes are suitable. For rotationally symmetric aspheres or segments a combination of a shifting table and a turning bearing can be used. For surfaces of arbitrary shape means are needed, which allow arbitrary three-dimensional movements in space. In case the angle of incidence of the measurement beam with respect to the object surface becomes too large during the measurement process, additional tilting of the surface can become necessary.

In a further advantageous embodiment, directing the measurement beam onto the object surface at least two different probing locations includes splitting the measurement beam into at least two partial measurement beams and directing the single partial measurement beams at respective probing locations, thereby illuminating a respective areal element of the object surface at each probing location. Preferably, splitting said measurement beam into at least two partial measurement beams is conducted by using a microlens array and/or an array of holograms, in particular computer generated holograms (CGH's). In particular, a row or a two dimensional grid of microlenses or holograms can be used. Therewith the measurement beam can be split into a row or a grid of partial measurement beams, respectively. This embodiment of the invention allows particularly fast data acquisition for determining the shape of a rough surface. By using the microlens array and/or the array of holograms, the phase distribution at a number of probing locations can be measured simultaneously. In case of CGH's, each partial measurement beam passes through a diffraction structure. In such CGH's a rotationally symmetric component of the diffraction structure moves the focus of the measurement beam parallel to the optical axis of the imaging device. If a carrier frequency is contained in such a diffraction structure, the partial measurement beam is directed away from the optical axis. It is further advantageous, if the at least two partial measurement beams have a common Fizeau reference plane. The phase distributions for the single partial measurement beams are evaluated accordingly to determine the corresponding offsets of the object surface. For example an array of 10 by 10 microlenses can be used in conjunction with a CCD-camera of 1000 by 1000 pixels. Each partial interferogram is then recorded by an area of 100 by 100 pixels within the CCD-camera, which is sufficient for a shape measurement of good quality.

In a further advantageous embodiment the object and the partial measurement beams are moved relative to each other, such that the partial measurement beams thereby illuminate respective continuous scan areas of the object surface, wherein neighboring continuous scan areas have a region of overlap. Such a continuous scan area can be the area illuminated by a single linear scan of the measurement beam. Preferably the continuous scan area covers the area of several linear scan lines arranged next to each other, i.e. the continuous scan area has a square or a rectangular shape with the opposite pairs of sides of the rectangle being of similar dimension. Preferably, the overlap region has at least the size of the areal element of the object illuminated at a given time. It is further advantageous, if the phase distribution values measured at said region of overlap for each of said neighboring continuous scan areas are referenced to each other using a stitching algorithm. Put in different words, a full-aperture data map can be synthesized from a series of overlapped sub-aperture data maps. In case of partial measurement beams generated by the microlens array and/or the array of holograms the set of partial measurement beams are advantageously scanned laterally to the beam direction in such way, that the fields scanned by of neighbouring partial measurement beams overlap. This allows subsequently adapting the constant components—also called offsets—of the corresponding shape regions attributed to each partial measurement beam to each other using a stitching algorithm.

Put in different words, the object surface can be divided into a number of partial regions or continuous scan areas, each defined by the area illuminated by a respective partial measurement beam during a scan process. A first partial region can be assigned an offset of zero. The object is then be moved such, that the neighbouring partial regions overlap. Subsequently, the offsets of all partial regions are adapted starting from the first partial region, such that the measurements of the surface topography match in the overlapping regions. For surfaces having rotational symmetry or segments of such surfaces it is in particular possible to split the beam of an imaging device of the interferometer into a grid of partial beams, for example by computer generated holograms. The computer generated holograms are configured such, that each partial measurement beam is focused onto the design shape of the object. The object is then rotated around its rotational axis and is thereby scanned by the partial measurement beams along circular path lines. It is advantageous to configure the grid of partial measurement beams such, that the focal points of the respective partial measurement beams are located at various distances from the rotational axis of the object. In case of a surface of arbitrary shape, in which in general no rotational axis is defined, the object surface is advantageously sampled point by point. In an embodiment alternative to sampling the probing locations with overlapping regions, absolute defocus-values for each probing location can be determined from the interferograms using the known properties of the reference beam of the interferometric system.

In a further advantageous embodiment according to the invention the f-number of the optical imaging system is adjusted such, that a respective extension, in particular a respective diameter, of the illuminated areal elements is smaller than an autocorrelation length of the rough surface. The autocorrelation length characterizes the rough object surface in a lateral dimension, that means along the shape of the object surface. By adjusting the f-number of the imaging device, in particular of an optical imaging system, such that the diameter of the central bright region, in particular of the Airy-disk created by the imaging device, is smaller than the typical autocorrelation length the following effect is obtained. Within illuminated areal element of the object surface the height of the object surface typically varies by less than $\lambda/4$ so that the phase variation within the reflected outgoing wave is less than $\lambda/2$. This leads to a reduced appearance of speckle.

In an advantageous embodiment the coordinate measurement machine according to the invention is configured to be a bridge type coordinate measurement machine comprising a bridge type structure adapted for moving the means relative to the object. Advantageously the bridge type structure comprises two vertical columns and one crossbeam connecting the vertical columns. In an alternative embodiment the coordinate measurement machine is configured to be a horizontal arm type coordinate measurement machine comprising a horizontal arm adapted for moving said means relative to the object. Preferably the bridge type structure and the horizontal arm can be moved respectively in three dimensions of space with the object being fixed.

It is a further object of the invention to provide a method and means, which facilitate the determination of the shape of a surface of an object in a time efficient manner. This object is solved according to the present invention by providing a method for determining the shape of a surface of an object comprising the steps of providing an interferometer for wave front measurement comprising a measurement beam of electromagnetic radiation, which measurement beam comprises an incoming wave for illuminating the object surface and an outgoing wave comprising radiation from the incoming wave reflected off the object surface, splitting the measurement beam into at least two partial measurements beams and directing the single partial measurement beams onto said object surface at respective probing locations, and measuring the respective phase distribution of the outgoing wave by means of the interferometer for each probing location. Advantageously, the shape of the object surface is determined from the measured phase distributions.

Further, the object is achieved by means for the determining the shape of a surface of an object, which means are adapted for interferometric wave front measurement and include a measurement beam of electromagnetic radiation, which measurement beam comprises an incoming wave for illuminating the object surface and an outgoing wave comprising radiation from the incoming wave reflected off the object surface, wherein the means comprise a splitting device for splitting the measurement beam into at least two partial measurement beams and a directing device for directing the single partial measurement beams onto the object surface at respective probing locations, and the means being adapted for measuring the respective phase distributions of the outgoing wave for each probing location.

Preferably, splitting the measurement beam into at least two partial measurement beams is condensed using a micro lens array and/or an array of holograms, in particular computer generated holograms (CGH's). In particular, a row or a two dimensional grid of micro lenses or holograms can be used. Due to the function of acquiring the shape information of the object surface in a parallel fashion according to the inventive method and means the shape of the object surface can be measured very fast.

In an advantageous embodiment of the inventive method mentioned last the object surface is a smooth surface having a roughness related height variation smaller than one tenth of a wavelength λ inventive of the electromagnetic radiation. Features mentioned previously with respect to the inventive method and means for the determining the shape of a rough surface can be included in the inventive method and means for the determining the surface of an object having an arbitrary surface structure, in particular having a smooth surface to form advantageous embodiments.

It is a further object of the invention to provide an optical element having improved optical imaging properties.

This object is achieved according to the present invention by an optical element, in particular producible or produced by using the above mentioned method, comprising a rough surface having a given roughness related height variation and a given design shape, wherein the tolerance of the actual shape of the surface of said optical element with respect to its design shape is less than half of the given roughness related height variation. Preferably, the tolerance is less than a quarter of the given roughness related height variation. Due to the tight tolerance regarding deviations with respect to the design shape improved optical imaging properties can be obtained for the optical element according to the invention. The optical element can be a lens or a mirror. The design shape can be spherical, but can also be aspherical.

Further, the above object is achieved according to the invention by a mandrel for manufacturing an optical element, preferably for manufacturing an astronomical telescope, in particular producible or produced by using the above mentioned method, comprising a rough surface having a given roughness related height variation and a given design shape, wherein the error tolerance regarding deviations of the actual shape of the surface of said mandrel with respect to its design shape is less than half of the given roughness related height variation. By means of a mandrel of such surface accuracy optical elements having improved tolerances regarding the deviations of their surface from their design surface can be obtained.

The method for determining the shape of a rough surface of an object according to the invention facilitates the verification of the shape accuracy obtained in a given manufacturing stage of the optical element or the mandrel. As a next step in the manufacturing process e.g. optical elements can be chosen, which meet the required tolerance, while the remaining optical elements or mandrels are discarded. Alternatively, the optical elements or mandrels which do not yet meet the tolerance can be reworked and verified again subsequently regarding their tolerance using the inventive method.

It is a further object of the invention to provide a method for calibrating means for determining the shape of a rough surface of an object of a given design shape precisely and cost-efficiently.

This object is achieved according to the invention by a method for calibrating means for determining the shape of a rough surface of an object comprising the steps of providing the means adapted for measuring a rough surface of a given design shape, manufacturing an object having a rough surface of the design shape within a given tolerance using the means for obtaining and/or verifying the is tolerance, polishing the object surface, verifying the shape of the polished surface to match the design shape within the tolerance using means for measuring the shape of a smooth surface, and calibrating the means using the polished object. A rough surface in this context is preferably a surface having a roughness related height variation of more than one tenth of a wavelength of the electromagnetic radiation used by the means for determining in the shape of the rough surface. A smooth surface in this context preferably has a roughness related height variation of less than one tenth of this wavelength. In an advantageous embodiment, a green body of the object is first cut, ground and lapped, resulting in a matt surface in a first approximation of the desired design shape. After that the shape of the rough surface of the object is determined by the uncalibrated means, in particular the above-mentioned means for determining the shape of a rough surface. In case the deviations of the actual surface are larger than desired, a further lapping step is conducted for bringing the shape of the object closer to the design shape. In case the deviations are within the given limits, the object is polished. Afterwards, the polished or smooth surface is measured by means known in the state of the art for measuring the shape of a smooth surface. If the deviations are within limits, the above means are calibrated using the polished object. The single steps and features described above in the advantageous embodiment of the calibration method can also be applied individually or in any combination with steps of the calibration method according to the invention.

The features specified above with respect to the inventive method can be transferred correspondingly to the inventive means. Advantageous embodiments of the inventive means resulting therefrom shall be covered by the disclosure of this invention.

BRIEF DESCRIPTION OF THE DRAWINGS

A brief description of the present invention is provided herein below with reference to the following diagrammatic drawings, in which:

FIG. 4b is a depiction of an averaged interferogram obtained by averaging several single interferograms according to FIG. 4a.

FIG. 5b illustrates a sampling pattern of the object surface using the means according to FIG. 5a.

FIG. 6b illustrates a sampling pattern of an object surface using the means according to FIG. 6a.

FIG. 7 illustrates a CGH-array used in the means according to FIG. 6a.

DESCRIPTION OF THE PREFERRED EMBODIMENTS

Figure 1A:
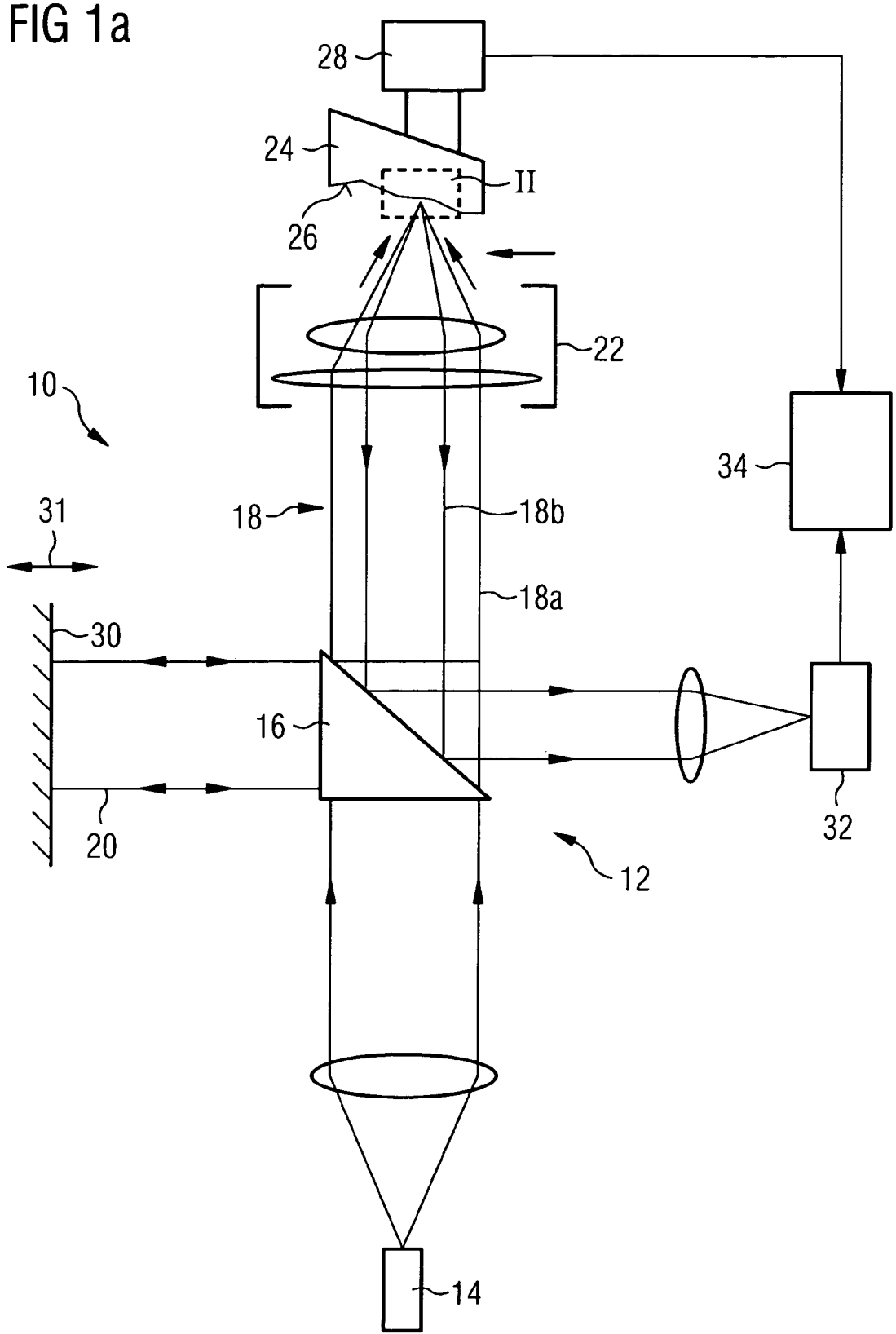
FIG. 1a is a schematic view of a first embodiment of means for determining the shape of a rough surface of an object according to the invention.

The preferred embodiments of the present invention will now be described with reference to FIGS. 1-8 of the drawings. Identical elements in the various figures are designated with the same reference numerals.

Figure 1B:
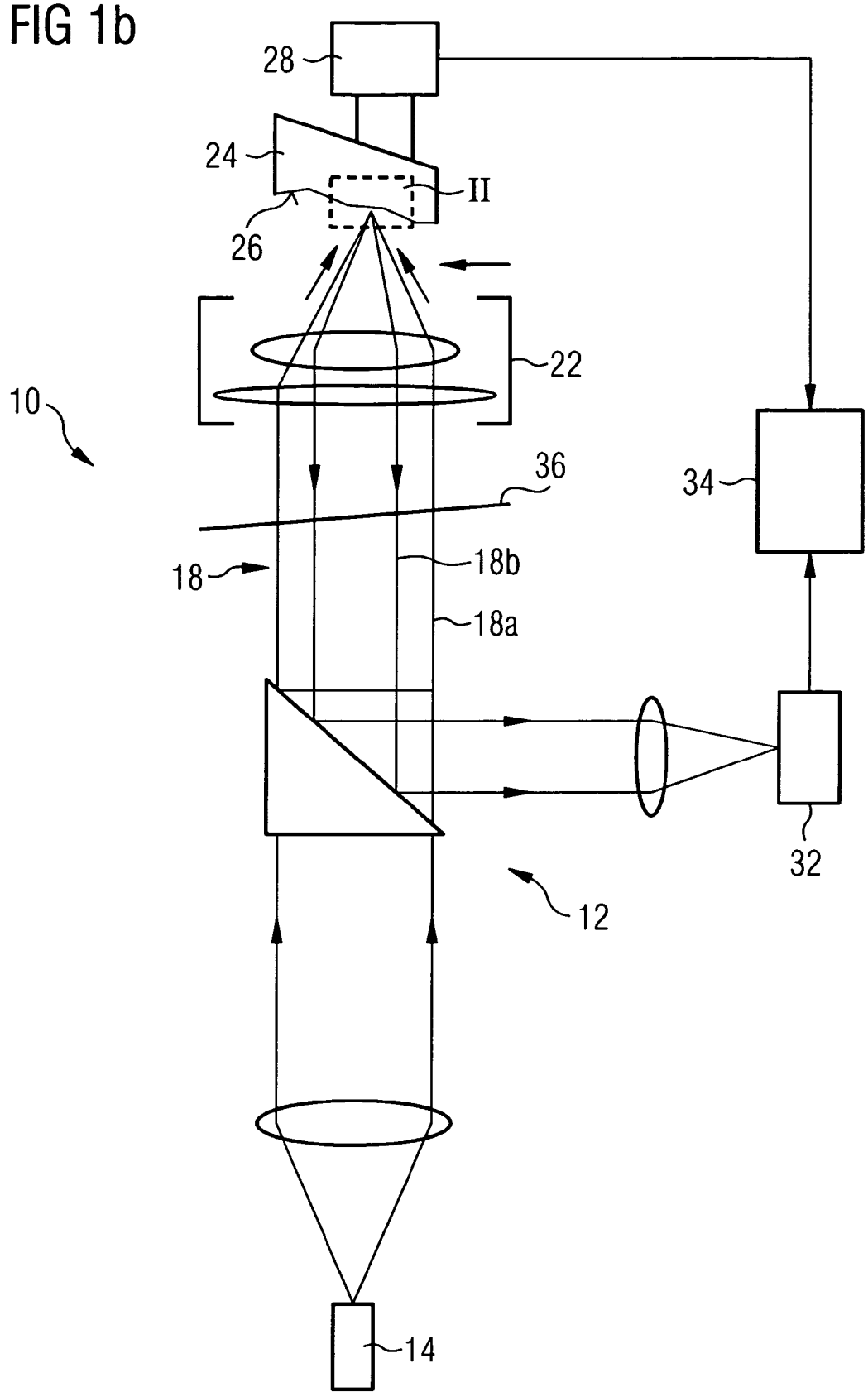
FIG. 1b is a schematic view of a second embodiment of means for determining the shape of a rough surface of an object according to the invention.

FIGS. 1a and 1b show a first and a second embodiment of means 10 according to the invention for determining the shape of a rough surface 26 of an object 24. The means 10 comprise in each embodiment an interferometer 12 adapted for wave front measurement. In the first embodiment shown in FIG. 1a the interferometer 12 is implemented as a Michelson-scanning interferometer while in the second embodiment the interferometer 12 is a Fizeau-Interferometer. The interferometer 12 can also be of a different type suitable for measuring the wave front of a light wave, like for example a Mireau-interferometer or an interferometer based on Direct Measuring Interferometry.

The interferometer 12 shown in FIG. 1a comprises a light source 14 in form of a laser generated coherent light of a given wavelength $\lambda$. The light generated by the light source 14 is split by a beam splitter 16 into a measurement beam 18 and a reference beam 20. The measurement beam 18 has an incoming wave 18a, which is focused onto the surface 26 of the object 24 using an imaging device 22, e.g. in the form of focusing optics. The object 24 is held by an actuator 28 for translating or rotating the object 24 such, that a design surface of the object surface 26 is always in the focal point of the imaging device 22. The incoming wave 18a is reflected off the object surface 26, resulting in an outgoing wave 18b of the measurement beam 18 travelling oppositely to the incoming wave 18a. The wave front or the phase distribution of the outgoing wave 18b reflects the profile of the object surface 26 within the area illuminated by the incoming wave 18a.

Figure 4A:
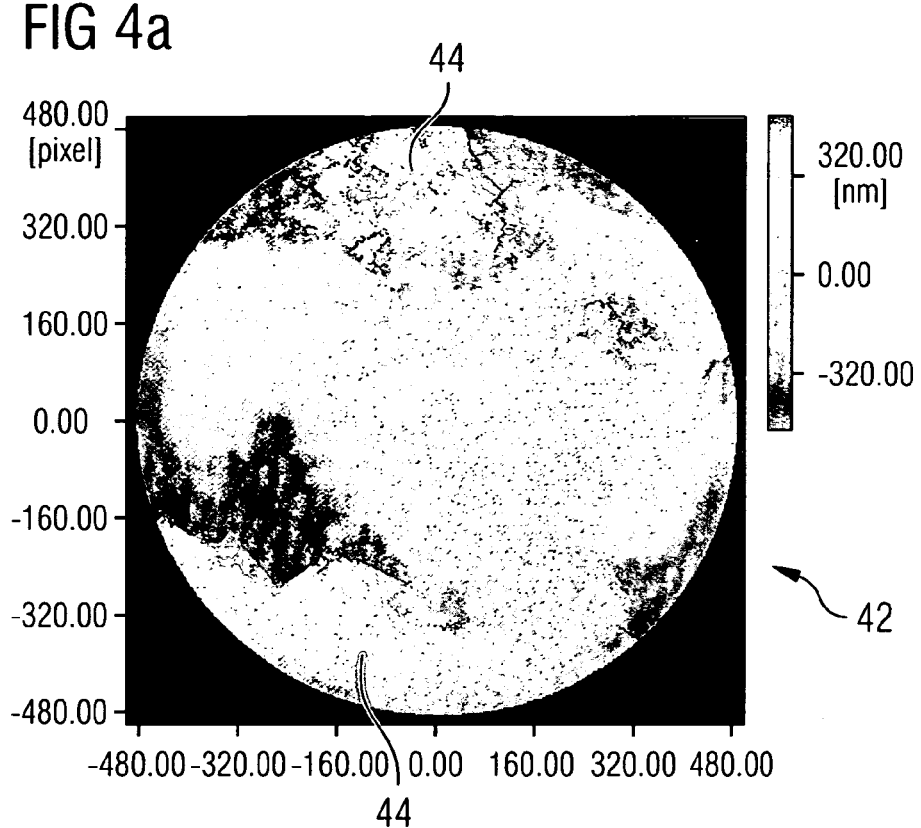
FIG. 4a shows an example of an interferogram obtained in the process of conducting the inventive method.

The reference beam 20 is reflected at a reflector 30, which is movable in the direction of the reference beam 20, as indicated by a translation arrow 31. The outgoing wave 18b of the measurement beam 18 is recombined with the reference beam 20 by the beam splitter 16 and imaged onto a light detector 32 in form of a CCD-detector. The phase distribution of the outgoing wave 18b of the measurement beam 18 is then measured by recording interferograms 42, one for each of at least 3 different positions of the reflector 30. An example of such an interferogram 42 is shown in FIG. 4a. The phase distribution of the outgoing wave 18b is determined this way for at least two different probing locations by means of the analysing device 34. As mentioned above, means for determining the shape of a rough surface according to the embodiment shown in FIG. 1b comprise a Fizeau-Interferometer 12 having a reference plane 36 indicated in the Figure. The functionality of the means 12 shown in FIG. 1b corresponds to the functionality of the means 12 according to FIG. 1a described above.

Figure 2:
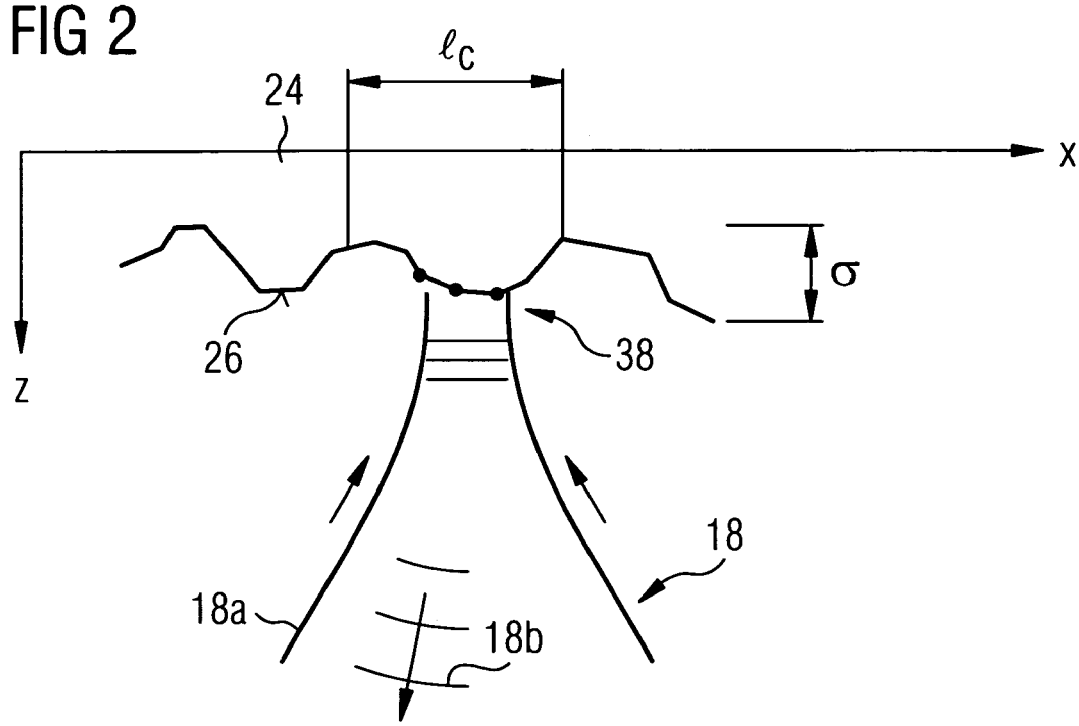
FIG. 2 is an enlarged view of the area designated by II in FIG. 1a and FIG. 1b.

FIG. 2 shows an enlarged view of the area designated by II in FIGS. 1a and 1b including a region of the object surface 26 illuminated by the incoming wave 18a of the measurement beam 18 during wave front measurement. The roughness related height variation of the object surface 26 is characterized by the root mean square ($\sigma$) of the height variation (rms-height $\sigma$). The incoming wave 18a of the measurement beam 18 illuminates an areal element 38 of the object surface 26. The areal element 38 is in this case illuminated by the Airy-disk of the incoming wave 18a created by the imaging device 22. The illuminated areal element 38 is small enough for the height variation of the surface area 26 illuminated to be smaller than a quarter of the wave length $\lambda$ of the incoming light.

Partial waves originating from different points within the illuminated area of the object surface 26 are superimposed to result in the outgoing wave 18b. The outgoing wave 18b contains very little speckle due to the maximum height variation within the illuminated areal element 38 of the object surface 26 being smaller than a quarter of the wavelength $\lambda$. In order to achieve this requirement the diameter of the illuminated areal element 38 should be smaller than the typical lateral autocorrelation length $l_c$ of the profile of the object surface 26.

Figure 3:
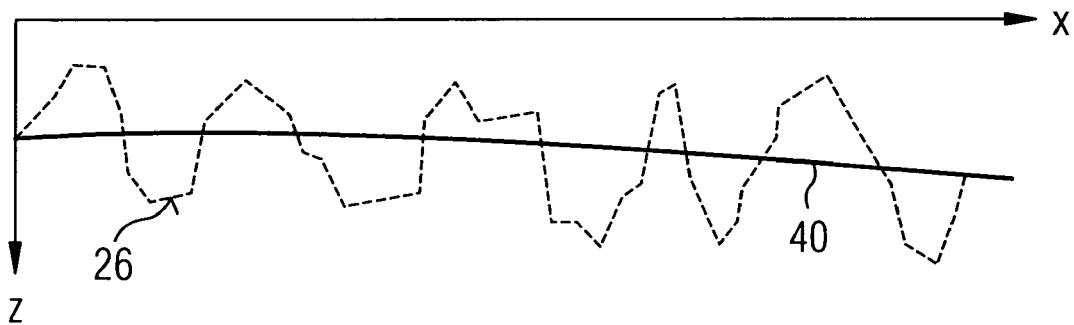
FIG. 3 is an illustration of the type of shape determined by a method according to the invention.

FIG. 3 illustrates the shape 40 of the rough object surface 26 determined according to the inventive method. Advantageously, the shape determined corresponds to an averaged profile of the rough surface 26 using an averaging interval larger than the autocorrelation length $l_c$.

FIG. 4a shows the intensity distribution of an interferogram 42 recorded by the light detector 32. Remaining speckles 44 can be seen in off-centered areas of the interferogram 42.

Figure 4B:
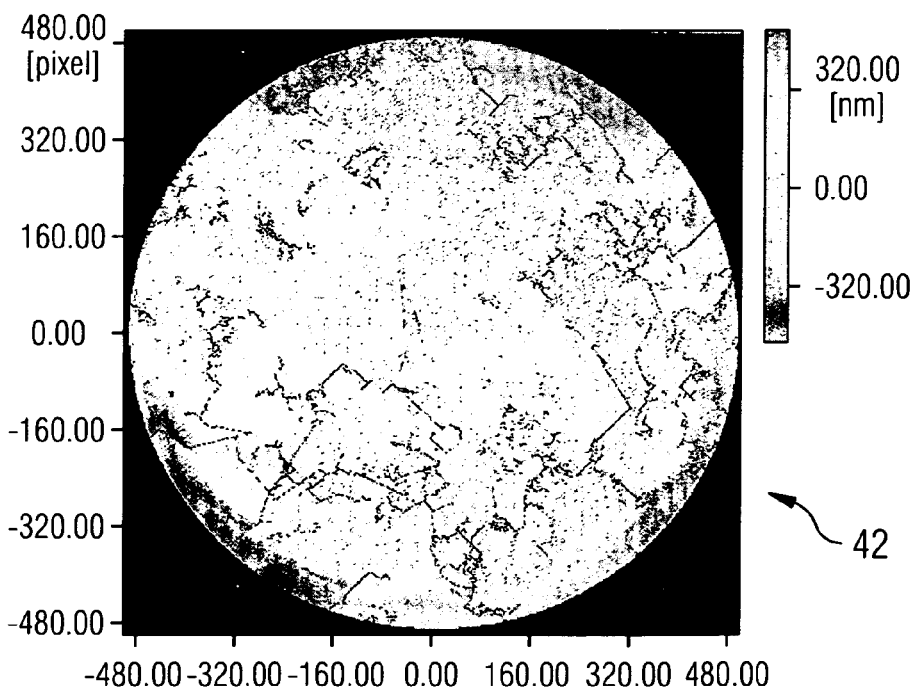
Figure 4C:
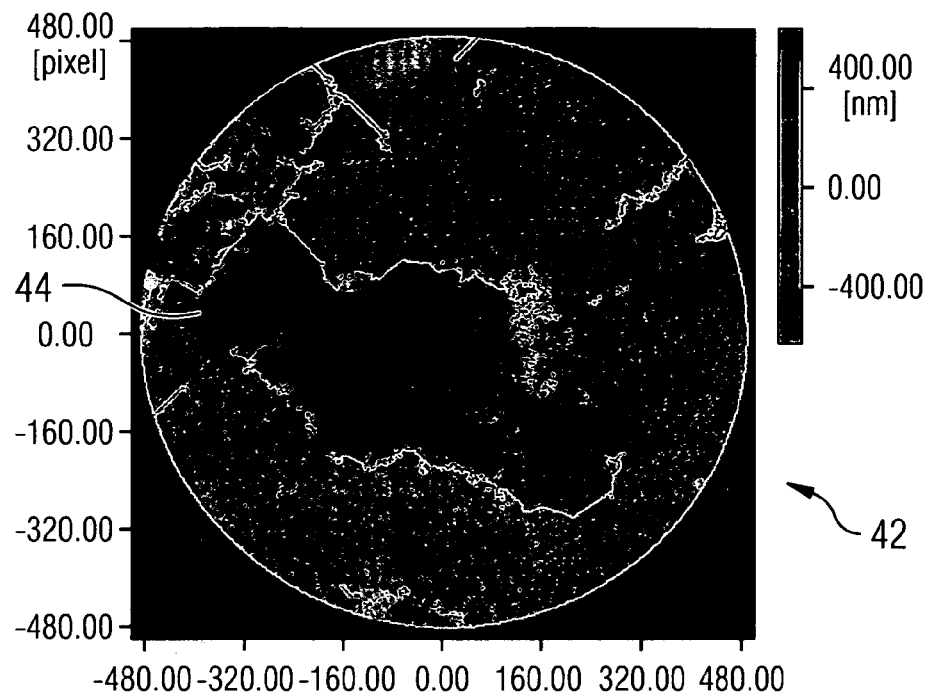
FIG. 4c shows an interferogram according to FIG. 4a obtained in an off-focused position of the object.
Figure 4D:
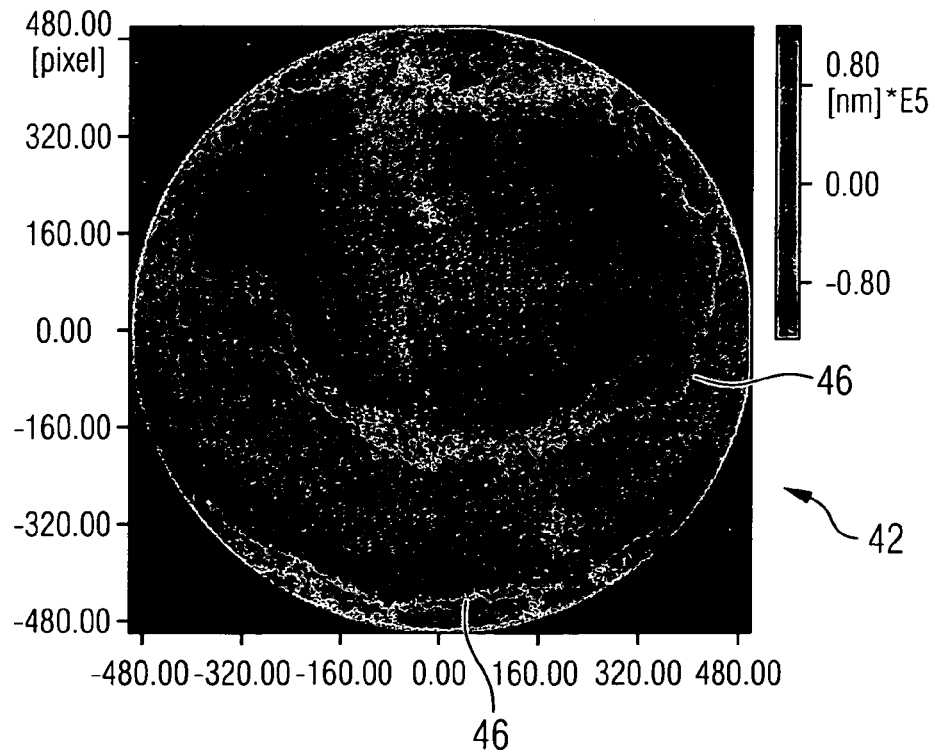
FIG. 4d shows an interferogram according to FIG. 4a obtained in another off-focused position of the object.

FIG. 4b shows the intensity distribution obtained by averaging several interferograms 42 each shifted by a few microns in a lateral direction with respect to the optical axis of the imaging device 22. FIGS. 4c and 4d show interferograms 42 obtained with the object surface 26 being out of focus. In the interferogram 42 according to FIG. 4c a large area of speckle can be seen in a central location of the interferogram 42. In the interferogram 42 according to FIG. 4d two interference rings 46 appear. It has been found, that in case the object surface 26 is that far out of focus, that the resulting interferogram has more than +−2 interference rings 46, the amount of speckle 44 increases significantly, leading to a corresponding reduction of measurement accuracy. Therefore, more than +/−10, preferably +/−2 interference rings 46 in the interferogram 42 should be avoided.

Figure 5A:
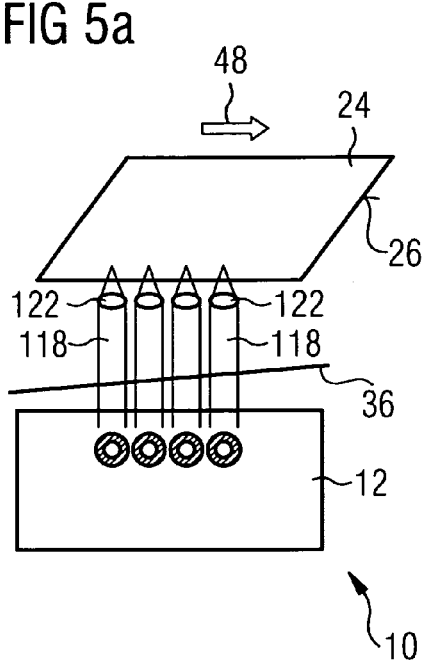
FIG. 5a is a schematic view a third embodiment of the means for determining the shape of a rough surface of an object according to the invention.

FIG. 5a shows a third embodiment of the means for determining the shape of a rough surface of an object according to the invention. In this embodiment, the measurement beam 18 is split into several partial measurement beams 118 having a common Fizeau reference plane 36. Each of the partial measurement beams 118 are focused onto the object surface 26 by means of a row of microlenses 122.

Figure 5B:
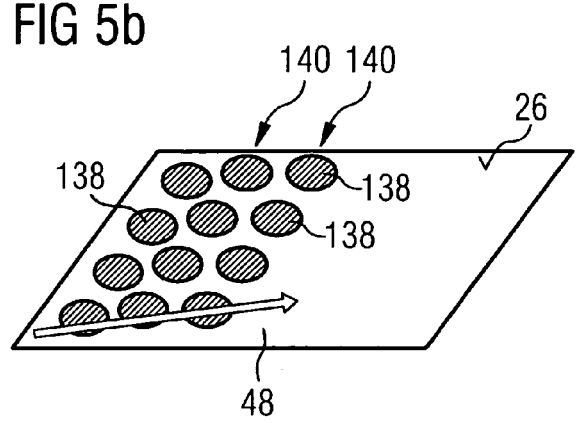

FIG. 5b illustrates the illumination of the object surface 26 effected by the means 10 according to FIG. 5a. A row 140 of illuminated areal elements 138 of the object surface 26 at respective probing locations is created. In order to measure the overall shape of the object surface 26 of the object 24, which in this case is of a flat shape, is scanned in a translation direction 48 lateral to the partial measurement beams 118. This way the object surface 26 is sampled over its entire area.

Figure 6A:
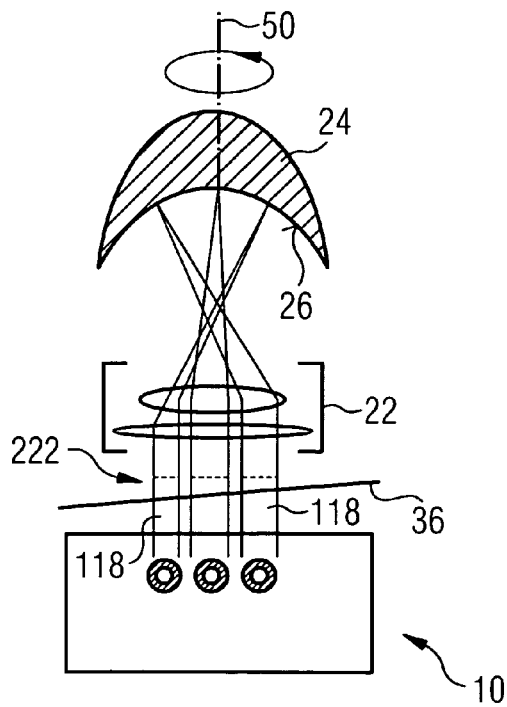
FIG. 6a illustrates a forth embodiment of the means for determining the shape of a rough surface of an object according to the invention.

FIG. 6a shows a forth embodiment of the means 10 for determining the shape of a rough surface of an object 24 according to the invention. In this embodiment, the measurement beam 18 is also split up into several partial measurement beams 118 having a common Fizeau reference plane 36 and focused onto an object 24, which in this case is of rotational symmetry using an array 222 of computer generated holograms (CGH's). An example of such an array 222 of computer generated holograms is shown in FIG. 7. It comprises several CGH-elements 224, each of which being designed to direct one of the partial measurement beams 118. The CGH element 224 shown in the centre of the array 222 is made of circular diffraction structures, which cause the focus of the resulting partial measurement beam 118 to be shifted in the direction of the optical axis. If carrier frequencies are contained in a CGH-element 224, as is the case in the surrounding CGH-elements 224 the partial measurement beam 118 is deviated away from the optical axis.

Figure 6B:
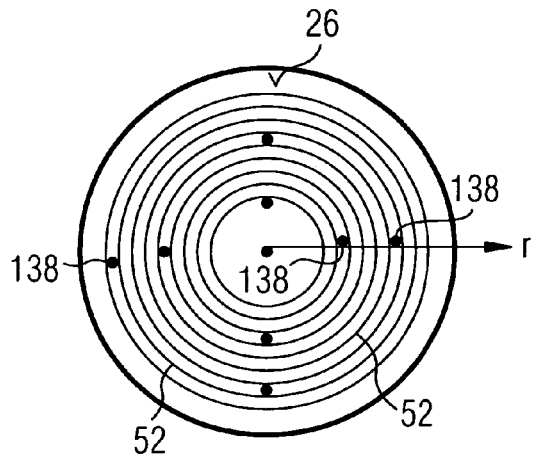

FIG. 6b shows the distribution of illuminated areal elements 138 created by the CGH-array 222 of FIG. 7 on the surface 26 of the object 24 shown in FIG. 6a. During the measurement process, the object 24 is rotated around a rotation axis 50 being parallel to the optical axis of the imaging device 22. This causes the illumination structures 138 to scan along circular path lines 52 on the object surface 26.

Figure 8:
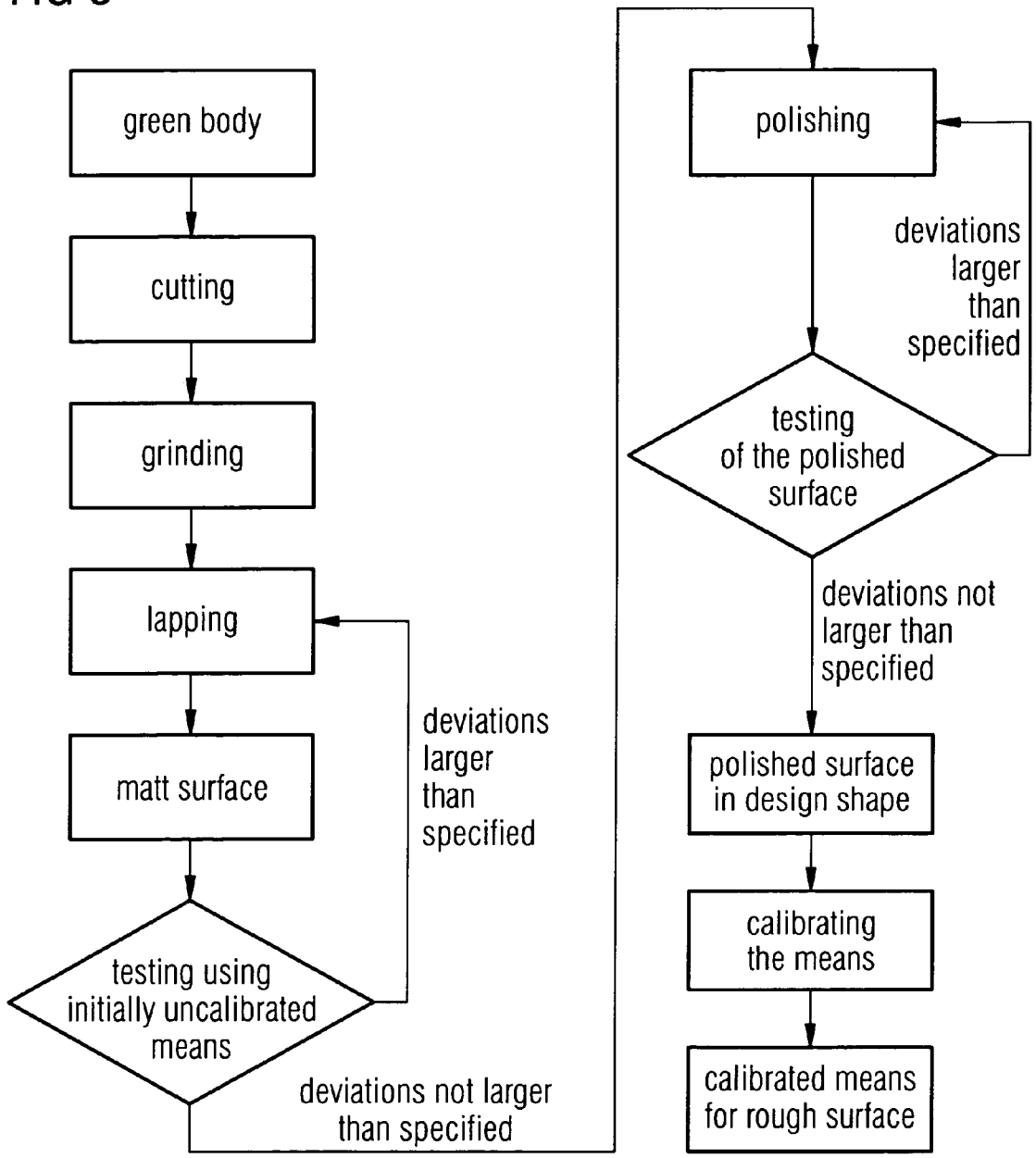
FIG. 8 shows a flow diagram of an inventive method for calibrating the inventive means.
Figure 4A:
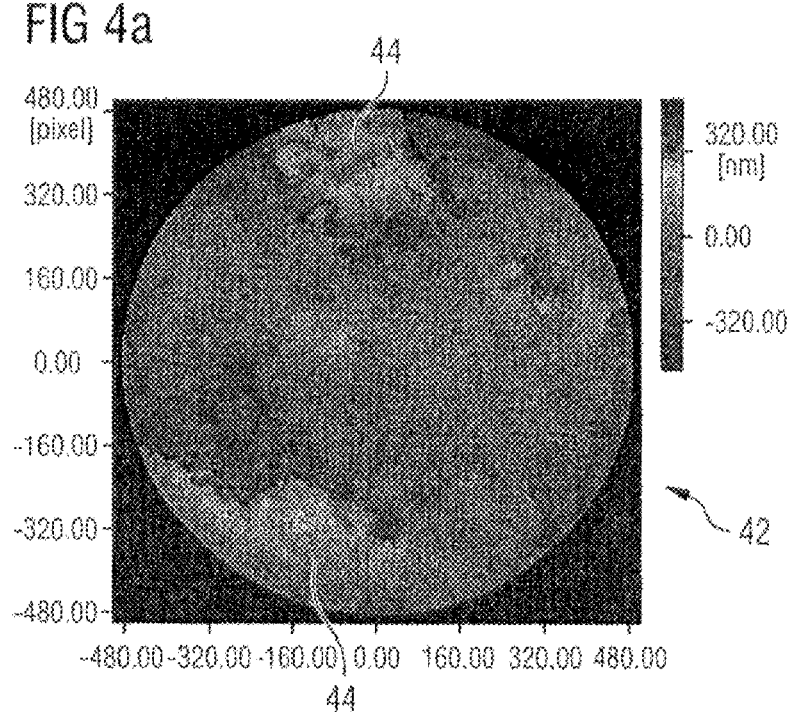
Figure 4B:
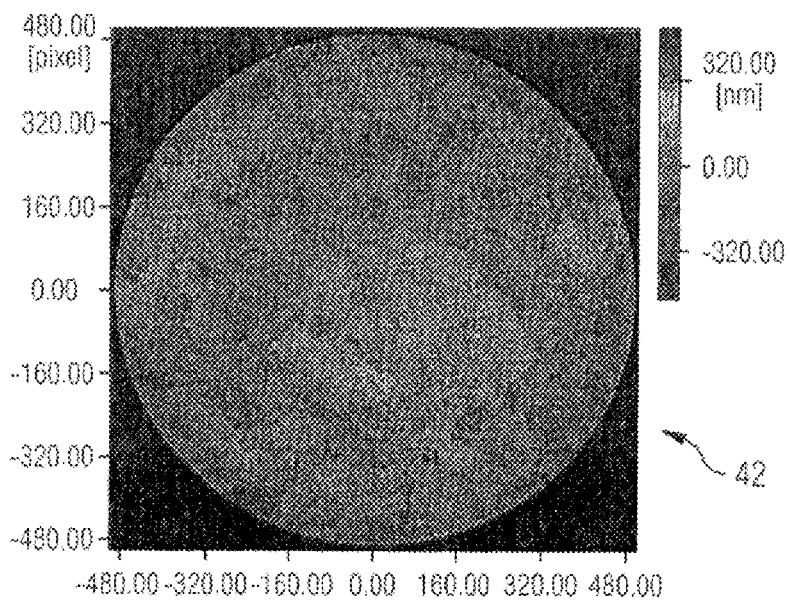

FIG. 8 illustrates a method for calibrating the means 10 for determining the shape of a rough object surface 26. In a first step, a green body of an object 24 is cut, ground and lapped into a desired design shape having a matt surface of a given roughness. Afterwards, the outer shape of the rough surface is determined using initially uncalibrated means 10. In case the measured shape has larger deviations than specified, the object 24 is reshaped mechanically. If the deviations are within limits, the object 24 is polished. Then the shape of the polished object 24 is determined using means known in the state of the art for measuring the shape of a smooth surface. In case the deviations from the design shape are not larger than specified, the means 10 are calibrated using the polished object 10.

The present invention provides a method and means for determining the shape of a rough surface of an object having a given roughness related height variation. The method according to the invention comprises the steps of providing an interferometer for wavement measurement comprising a measurement beam of electromagnetic radiation having a wavelength $\lambda$ not exceeding 10 times of the given roughness related height variation of the object surface, which measurement beam comprises an incoming wave for illuminating the object surface and an outgoing wave comprising radiation from the incoming wave reflected off the object surface, directing the incoming wave of the measurement beam onto the object surface at least two different probing locations using an imaging device, thereby illuminating an areal element of the object surface at each of the probing locations, wherein the areal element is dimensioned such, that the maximum height variation of the object surface within the respective areal element is smaller than the given overall roughness related height variation, and measuring the respective phase distribution of the outgoing wave by means of the interferometer at each probing location. With the method according to the present invention the measurement beam can be configured to contain coherent radiation. Due to the inventive measures the amount of speckle in the outgoing wave of the measurement beam remains within limits. Therefore the shape of a rough surface can be measured with an improved accuracy.

While the invention has been described with respect to a limited number of embodiments and applications, it will be appreciated that many variations, modifications and other applications of the invention may be made.

There has thus been shown and described a novel method and means for determining the shape of a rough surface of an object which fulfills all the objects and advantages sought therefor. Many changes, modifications, variations and other uses and applications of the subject invention will, however, become apparent to those skilled in the art after considering this specification and the accompanying drawings which disclose the preferred embodiments thereof.

All such changes, modifications, variations and other uses and applications which do not depart from the spirit and scope of the invention are deemed to be covered by the invention, which is to be limited only by the claims which follow.

What is claimed is:

1. Method for determining the shape of a rough surface of an object having a given roughness related height variation comprising the steps of:
providing an interferometer for wave front measurement comprising a measurement beam of electromagnetic radiation having a wavelength $\lambda$ not exceeding ten times of said given roughness related height variation of said object surface, which measurement beam comprises an incoming wave for illuminating said object surface and an outgoing wave comprising radiation from said incoming wave reflected off said object surface,
directing said incoming wave of said measurement beam onto said object surface at least two different probing locations, thereby illuminating an areal element of said object surface at each of said probing locations, wherein said areal element is dimensioned such that the maximum height variation of said object surface within the respective illuminated areal element is smaller than said given roughness related height variation, and
measuring the respective phase distribution of said outgoing wave by means of said interferometer at each probing location.

2. Method according to claim 1, wherein said incoming wave of said measurement beam is directed onto said object surface by focusing said incoming wave onto said object surface using an imaging device.

3. Method according to claim 2, wherein said object surface has a given design shape and said measurement beam is focused onto said object surface by adjusting the focus of said imaging device to the surface of said design shape at the respective probing location.

4. Method according to claim 2, wherein focusing said incoming wave of said measurement beam onto said object surface includes the steps of setting the focus of said imaging device to a starting focus position and at least one deviated focus position, recording an interferogram generated by said outgoing wave and a reference beam of said interferometer for each focus position, determining the amount of speckle in the respective interferogram for each focus position and adjusting the focus of said imaging device to the focus position attributed to the interferogram having the smallest amount of speckle.

5. Method according to claim 2, wherein directing said incoming wave of said measurement beam onto said object surface includes the steps of setting the focus of said imaging device to a starting focus position and at least one deviated focus position, recording an interferogram generated by said outgoing wave and a reference beam of said interferometer for each focus position, determining the maximum spatial frequency of each of said interferograms by Fourier Transform and adjusting the focus of said imaging device to the focus position attributed to the smallest maximum spatial frequency.

6. Method according to claim 2, wherein the f-number of said imaging device is adjusted such, that a respective extension of said illuminated areal elements is smaller than an autocorrelation length of said rough object surface.

7. Method according to claim 1, wherein the maximum height variation of said object surface within said respective illuminated areal element is smaller than half particular smaller than a quarter of said wavelength $\lambda$ of said measurement beam.

8. Method according to claim 1, wherein said electromagnetic radiation of said measurement beam comprises coherent radiation.

9. Method according to claim 1, wherein said shape of said object surface is derived from said measured phase distributions at said probing locations.

10. The method according to claim 9, wherein said shape of said object surface is derived by calculating an average phase for each of said measured phase distributions.

11. Method according to claim 1, wherein said phase distribution of said outgoing wave is measured by recording at least one interferogram.

12. Method according to claim 11, wherein the focus of said imaging device is adjusted such that at most two interference maxima are generated in a single interferogram.

13. Method according to claim 11, wherein said phase distribution of said measurement beam is determined from the information contained in a central area of said at least one interferogram.

14. Method according to claim 1, wherein for each probing location phase distribution measurements are made at least two measurement positions on said object surface being spaced apart by less than the distance between neighbouring probing locations and the shape of said object surface is derived by respectively averaging the measurement results obtained at the respective measurement positions of each of said probing locations.

15. Method according to claim 1, wherein directing said measurement beam onto said object surface at at least two different probing locations includes subsequently directing said measurement beam at each of said probing locations.

16. The method according to claim 15, wherein directing said measurement beam onto said object surface includes scanning said measurement beam along said object surface.

17. Method according to claim 1, wherein directing said measurement beam onto said object surface at at least two different probing locations includes splitting said measurement beam into at least two partial measurement beams and directing the single partial measurement beams to respective probing locations, thereby illuminating a respective areal element of said object surface at each probing location.

18. Method according to claim 17, wherein splitting said measurement beam into at least two partial measurement beams is conducted by using at least one of a microlens array and an array of holograms.

19. Method according to claim 17, including the step of moving said object and said partial measurement beams relative to each other, such that said partial measurement beams thereby illuminate respective continuous scan areas of said object surface, wherein neighboring continuous scan areas have a region of overlap.

20. Method for determining the shape of a surface of an object, comprising the steps of:
providing an interferometer for wave front measurement comprising a measurement beam of electromagnetic radiation, which measurement beam comprises an incoming wave for illuminating said object surface and an outgoing wave comprising radiation from said incoming wave reflected off said object surface,
splitting said measurement beam into at least two partial measurement beams,
directing the single partial measurement beams onto said object surface at respective probing locations, and
measuring the respective phase distribution of said outgoing wave by means of said interferometer for each probing location,
moving said object and said partial measurement beams relative to each other, such that said partial measurement beams thereby illuminate respective continuous scan areas of said object surface, wherein neighboring continuous scan areas have a region of overlap,
wherein the phase distribution values measured at said region of overlap for each of said neighboring continuous scan areas are referenced to each other using a stitching algorithm.

21. Method according to claim 20, wherein said object surface is a smooth surface having a roughness related height variation smaller than one tenth of a wavelength $\lambda$ of said electromagnetic radiation.

22. Means for interferometric wave front measurement for determining the shape of a rough surface of an object having a given roughness related height variation, said means including a measurement beam of electromagnetic radiation having a wavelength $\lambda$ not exceeding ten times the said given roughness related height variation of said object surface, which measurement beam comprises an incoming wave for illuminating said object surface and an outgoing wave comprising radiation from said incoming wave reflected off said object surface, wherein said means further comprise a directing device for directing said incoming wave of said measurement beam onto said object surface at least two different probing locations and thereby illuminating an areal element of said object surface at each of said probing locations, wherein said areal element is dimensioned such that the maximum height variation of said object surface within the respective illuminated areal element is smaller than said given roughness related height variation, and wherein said means are adapted for measuring the respective phase distribution of said outgoing wave at each probing location.

23. Means according to claim 22, wherein said directing device comprises an imaging device for directing said incoming wave of said measurement beam onto said object surface by focusing said incoming wave onto said object surface.

24. Means according to claim 23, wherein said means include a splitting device for splitting said measurement beam into at least two partial measurement beams and said imaging device comprises means for directing the single partial measurement beams at respective probing locations.

25. Means according to claim 24, wherein said imaging device comprises at least one of a microlens array and an array of holograms.

26. Means according to claim 22, wherein said electromagnetic radiation of said measurement beam comprises coherent radiation.

27. Means according to claim 26, wherein said coherent radiation has a longitudinal coherence length of at least 10 µm.

28. Coordinate measurement machine comprising the means according to claim 22.

29. Coordinate measurement machine according to claim 28, further comprising a controlling device for controlling said directing of said measurement beam onto said object surface, which controlling device is adapted for causing the focus of an imaging device to be set to a starting focus position and at least one deviated focus position, an interferogram generated by said outgoing wave and a reference beam of said interferometer to be recorded for each focus position, the amount of speckle in the respective interferogram to be detected for each focus position and the focus of said imaging device to be adjusted to the focus position attributed to the interferogram having the smallest amount of speckle.

30. Coordinate measurement machine according to claim 28, further comprising a controlling device for controlling said directing of said measurement beam onto said object surface, which controlling device is adapted for causing the focus of an imaging device to be set to a starting focus position and at least one deviated focus position, an interferogram to be generated by said outgoing wave and a reference beam of said interferometer for each focus position, the maximum spatial frequency of each of said interferograms to be determined by Fourier Transform and the focus of said imaging device to be adjusted to the focus position attributed to the smallest maximum spatial frequency.

31. Means for interferometric wave front measurement for determining the shape of a surface of an object, said means including a measurement beam of electromagnetic radiation, which measurement beam comprises an incoming wave for illuminating said object surface and an outgoing wave comprising radiation from said incoming wave reflected off said object surface, wherein said means comprise a splitting device for splitting said measurement beam into at least two partial measurement beams and a directing device for directing the single partial measurement beams onto said object surface at respective probing locations, wherein said directing device comprises an imaging device for directing said incoming wave of said measurement beam onto said object surface by focusing said incoming wave onto said object surface, wherein said imaging device is adjustable such that said maximum height variation of said object surface within said respective illuminated areal element is smaller than half of a wavelength λ of said measurement beam, wherein said means are operative to measure the respective phase distribution of said outgoing wave for each probing location.

32. Means for interferometric wave front measurement for determining the shape of a surface of an object, said means including a measurement beam of electromagnetic radiation, which measurement beam comprises an incoming wave for illuminating said object surface and an outgoing wave comprising radiation from said incoming wave reflected off said object surface, wherein said means comprise a splitting device for splitting said measurement beam into at least two partial measurement beams and a directing device for directing the single partial measurement beams onto said object surface at respective probing locations, wherein said directing device comprises an imaging device for directing said incoming wave of said measurement beam onto said object surface by focusing said incoming wave onto said object surface, wherein said object surface has a given design shape and said means directs said measurement beam onto said object surface by adjusting the focus of said imaging device to the surface of said design shape at the respective probing location,
    wherein said means are operative to measure the respective phase distribution of said outgoing wave for each probing location.

33. Means for interferometric wave front measurement for determining the shape of a surface of an object, said means including a measurement beam of electromagnetic radiation, which measurement beam comprises an incoming wave for illuminating said object surface and an outgoing wave comprising radiation from said incoming wave reflected off said object surface, wherein said means comprise a splitting device for splitting said measurement beam into at least two partial measurement beams and a directing device for directing the single partial measurement beams onto said object surface at respective probing locations, wherein said directing device comprises an imaging device for directing said incoming wave of said measurement beam onto said object surface by focusing said incoming wave onto said object surface, wherein the f-number of said imaging device is adjustable such that a respective extension of illuminated areal elements is smaller than an autocorrelation length of said rough object surface, wherein said means are operative to measure the respective phase distribution of said outgoing wave for each probing location.

34. Coordinate measurement machine comprising means for interferometric wave front measurement for determining the shape of a surface of an object, said means including a measurement beam of electromagnetic radiation, which measurement beam comprises an incoming wave for illuminating said object surface and an outgoing wave comprising radiation from said incoming wave reflected off said object surface, wherein said means comprise a splitting device for splitting said measurement beam into at least two partial measurement beams and a directing device for directing the single partial measurement beams onto said object surface at respective probing locations,
    wherein said means are operative to measure the respective phase distribution of said outgoing wave for each probing location, and
    wherein said coordinate measurement machine is configured to be a bridge type coordinate measurement machine comprising a bridge type structure adapted for moving said means relative to the object.

35. Coordinate measurement machine comprising means for interferometric wave front measurement for determining the shape of a surface of an object, said means including a measurement beam of electromagnetic radiation, which measurement beam comprises an incoming wave for illuminating said object surface and an outgoing wave comprising radiation from said incoming wave reflected off said object surface, wherein said means comprise a splitting device for splitting said measurement beam into at least two partial measurement beams and a directing device for directing the single partial measurement beams onto said object surface at respective probing locations,
    wherein said means are operative to measure the respective phase distribution of said outgoing wave for each probing location, and
    whereby said coordinate measurement machine is configured to be a horizontal arm type coordinate measurement machine comprising a horizontal arm adapted for moving said means relative to the object.

36. Method for calibrating means for measuring the shape of a rough surface of an object, said method comprising the steps of:
    providing said means for measuring the shape of a rough surface having a given design shape,
    manufacturing an object having a rough surface of said design shape within a given tolerance using uncalibrated means for at least one of obtaining and verifying said tolerance,
    polishing said object surface,
    verifying the shape of said polished surface to match said design shape within said tolerance using means for measuring the shape of a smooth surface, and calibrating said means using said polished object.

37. Method of calibrating according to claim 36, adapted for calibrating said means for determining the shape of a rough surface of an object according to claim 22.

38. Method of calibrating according to claim 36, adapted for calibrating said means for interferometric wave front measurement for determining the shape of a rough surface of an object, said means including a measurement beam of electromagnetic radiation, which measurement beam comprises an incoming wave for illuminating said object surface and an outgoing wave comprising radiation from said incoming wave reflected off said object surface, wherein said means comprise a splitting device for splitting said measurement beam into at least two partial measurement beams and a directing device for directing the single partial measurement beams onto said object surface at respective probing locations, wherein said means are operative to measure the respective phase distribution of said outgoing wave for each probing location.

* * * * *

UNITED STATES PATENT AND TRADEMARK OFFICE
CERTIFICATE OF CORRECTION

| | | |
|---|---|---|
| PATENT NO. | : 7,403,290 B1 | Page 1 of 1 |
| APPLICATION NO. | : 11/541180 | |
| DATED | : July 22, 2008 | |
| INVENTOR(S) | : Rolf Freimann | |

It is certified that error appears in the above-identified patent and that said Letters Patent is hereby corrected as shown below:

Column 10, line 11, after "verifying the", delete "is".

Signed and Sealed this

Seventh Day of October, 2008

JON W. DUDAS
*Director of the United States Patent and Trademark Office*

UNITED STATES PATENT AND TRADEMARK OFFICE
CERTIFICATE OF CORRECTION

PATENT NO. : 7,403,290 B1
APPLICATION NO. : 11/541180
DATED : July 22, 2008
INVENTOR(S) : Rolf Freimann It is certified that error appears in the above-identified patent and that said Letters Patent is hereby corrected as shown below:

Title Page
ABSTRACT (57)          line 12, after "surface", insert -- at --;

Drawing Sheet 4 of 8   Please add the attached replacement sheet.

Column 2,              lines 9 and 32, between "surface" and "at", insert -- at --;
Column 12,             line 48, insert a space between "+" and "-";
Column 14,             Line 30, between "surface" and "at", insert -- at --;
Column 16,             line 36, between "surface" and "at", insert -- at --.

Signed and Sealed this

Fourteenth Day of October, 2008

JON W. DUDAS
*Director of the United States Patent and Trademark Office*